US009049246B2

(12) United States Patent
Vecera et al.

(10) Patent No.: US 9,049,246 B2
(45) Date of Patent: Jun. 2, 2015

(54) REDUCING WEB PAGE LOADING TIME

(75) Inventors: Martin Vecera, Brno (CZ); Lukas Petrovicky, Most (CZ)

(73) Assignee: Red Hat, Inc., Raleigh, NC (US)

( * ) Notice: Subject to any disclaimer, the term of this patent is extended or adjusted under 35 U.S.C. 154(b) by 243 days.

(21) Appl. No.: 13/407,304

(22) Filed: Feb. 28, 2012

(65) Prior Publication Data

US 2013/0227056 A1 Aug. 29, 2013

(51) Int. Cl.
G06F 15/16 (2006.01)
H04L 29/08 (2006.01)
G06F 17/00 (2006.01)

(52) U.S. Cl.
CPC ............ H04L 67/2842 (2013.01); H04L 67/02 (2013.01)

(58) Field of Classification Search
None
See application file for complete search history.

(56) References Cited

U.S. PATENT DOCUMENTS

| 7,631,078 B2* | 12/2009 | Ackaouy et al. ............... 709/225 |
| 7,941,609 B2* | 5/2011 | Almog ........................... 711/137 |
| 7,970,923 B2* | 6/2011 | Pedersen et al. ............... 709/231 |
| 8,010,693 B2* | 8/2011 | Ramadas ....................... 709/232 |
| 2008/0133754 A1* | 6/2008 | Smyth et al. ................... 709/226 |
| 2011/0066676 A1 | 3/2011 | Kleyzit et al. |
| 2011/0153937 A1* | 6/2011 | Annamalaisami et al. ... 711/118 |
| 2012/0137210 A1* | 5/2012 | Dillon ........................... 715/234 |

* cited by examiner

Primary Examiner — Wen-Tai Lin
(74) Attorney, Agent, or Firm — Lowenstein Sandler LLP

(57) ABSTRACT

A backwards-compatible mechanism for reducing web page loading time is disclosed. A method includes forwarding, by a web server extension module of a server machine, a web page request to a web server component of the server machine, the web page request received from a client-side agent associated with the web server extension module. The method further includes receiving, from the web server component, page source code of a web page of the web page request, parsing the page source code to identify one or more resources associated with page source code, requesting the identified one or more resources from the web server component, compressing resources of the one or more resources that are received from the web server component into an archive file, and sending the page source code and the archive file to the client-side agent as one or more packages.

16 Claims, 5 Drawing Sheets

REDUCING WEB PAGE LOADING TIME

TECHNICAL FIELD

The embodiments of the invention relate generally to Internet communications and, more specifically, relate to reducing web page loading time with a backwards-compatible mechanism.

BACKGROUND

In the field of Internet communications, performance is a key aspect impacting web application usability and end-user experience. Users expect an almost immediate response from web sites. For example, it has been shown that even a three second delay leads to customer dissatisfaction and complaints. A typical web application operates via Internet, intranet, or other computer network that includes multiple interconnected devices located on network nodes (nodes), and has at least one web server and one client. The web server serves web pages in response to client requests, and the client presents them in a web browser to a requesting end user.

Modern web pages are usually composed of a base markup page (e.g., HyperText Markup Language (HTML) page), and multiple supporting resources and/or objects (e.g., images, CSS, JavaScript, JBoss™ code, etc.). Each base markup page has a web address represented in the form of a Uniform Resource Locator (URL). Resources can be of many different types, such as scripts (e.g. JavaScript), data resources (e.g. XML or other text-based data), style sheets, images and other page components. There are many image formats such as GIF, PNG, and JPEG. For a given HTML page, the number of different supporting resources may be in the range of tens or even hundreds.

For each of the resource of a web page, a network connection is established between a client (e.g., a web browser) and a web server. Typically, this connection uses Transmission Control Protocol (TCP) to establish a reliable path through the network. However, the creation of a TCP connection is an expensive operation for network hardware (e.g. switches and routers) and takes a relatively long time. For small files, creating a TCP connection may take longer than the data transfer of the file itself. Also, for each of the created TCP connections, there is an associated HyperText Transfer Protocol (HTTP) request and response that occurs. The HTTP request and response, in addition to taking additional time, also takes additional bandwidth because the meta-data of the HTTP request and response (e.g., "HTTP headers") is also transferred for every file.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
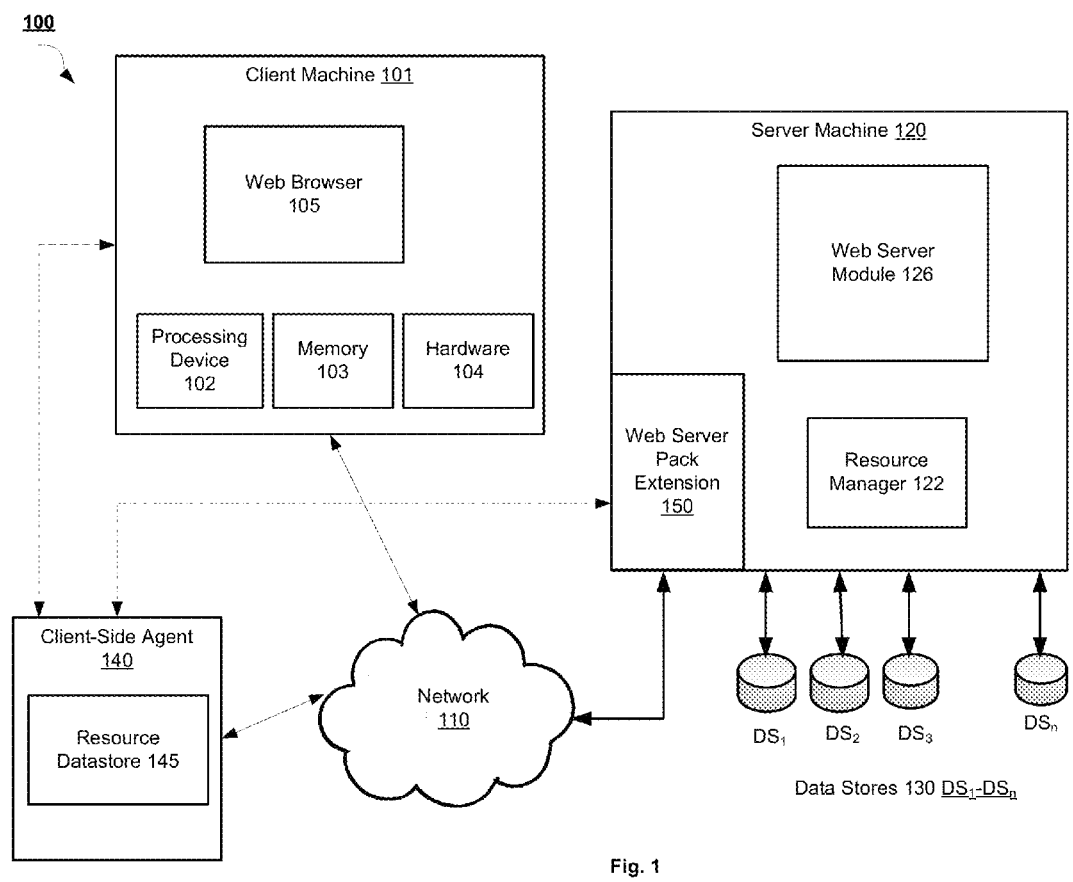
FIG. 1 is a block diagram of a network architecture implementing reduced web page loading time utilizing backwards-compatible mechanisms according to an embodiment.

Embodiments of the invention provide for reducing web page loading time with a backwards-compatible mechanism. A method of embodiments of the invention includes forwarding, by a web server extension module of a server machine, a web page request to a web server component of the server machine, the web page request received from a client-side agent associated with the web server extension module. The method further includes receiving, from the web server component, page source code of a web page of the web page request, parsing the page source code to identify one or more resources associated with page source code, requesting the identified one or more resources from the web server component, compressing resources of the one or more resources that are received from the web server component into an archive file, and sending the page source code and the archive file to the client-side agent as one or more packages.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "monitoring", "changing", "caching", parsing, "requesting", "compressing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer.

Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide for reducing web page loading time with a backwards-compatible mechanism. A web server extension may be installed at a web server to provide additional functionality to the web server in terms of reducing web page load time. The web server extension interacts with a corresponding agent on the client side. In one embodiment, when there is a request for a web page from a client application, the client-side agent changes a port number on a Transmission Control Protocol (TCP) connection of the request to a port number of the web server extension. The web server extension then receives and handles the request by obtaining the base HyperText Markup Language (HTML) code for the requested web page and passing it back to the client via the client-side agent.

In some embodiments, the web server extension parses the base HTML code to determine a list of resources that can be accessed from the web page. The web server extension then gathers those identified resources and sends them as a single compressed file to the client-side agent. The client-side agent then decompresses and stores the resources. When the client application then requests any of the resources of the web page, the client-side agent intercepts and handles those requests (e.g., by providing the request resource/object to the client application) so that no new connection to the web server is necessary.

FIG. 1 is a block diagram of a network architecture 100 implementing reduced web page loading time utilizing backwards-compatible mechanisms according to one embodiment. Network architecture 100 includes a client machine 101 communicably coupled to a server machine 120 via network 110. The client machine 101 may be any type of computing device including, but not limited to, a desktop computer, a laptop, a mobile device, a PDA, a tablet, or any other computing device. Server machine 120 may be any type of computing device including, but not limited to, a web server device, a server computer system, a desktop computer, a laptop, a mobile device, a PDA, a tablet, or any other computing device.

Network 110 may be a private network (e.g., a local area network (LAN), a wide area network (WAN), intranet, or other similar private networks) or a public network (e.g., the Internet). In some embodiments, network 110 can include any number of network devices and computing devices that are in communication over any combination of wired and wireless communication lines.

In one embodiment, client machine 101 includes a one or more hardware components including, but not limited to, a processing device 102, memory 103, and other hardware 104 (e.g., a display, I/O devices, network interface devices, etc.). Client machine executes a set of applications using the one or more hardware components. A 'set,' as used herein refers to any positive whole number of items including a single item. The applications can be any computer-executable program capable of communicating with a web server, such as server machine 120. In one embodiment, one of the applications is a web browser 105 that requests web page content and renders the received web page content on a display of the client machine 101.

The web browser 105 may receive a request for a web page from an end user of the client machine 101 that is utilizing the web browser 105 to view and access web content. When the user inputs a request to the web browser 105 to access a web page, the web browser creates a request for the content of the web page. In one embodiment, the request is a HyperText Transfer Protocol (HTTP) request for content located at a web address of the web page, which is represented in the HTTP request in the form of a Uniform Resource Locator (URL). The web browser 105 creates a TCP connection on a port of the client machine 101 in order to send the HTTP request to network 110. A communications infrastructure of the network 110 then handles routing the request to the identified location.

In one embodiment, the client machine 101 is communicably coupled to a client-side agent 140. Although illustrated as connected to the single client machine 101, in some embodiments, the client-side agent 140 is communicably coupled and interacts with more than one client machine 101. In one embodiment, the client-side agent 140 is software and/or firmware running on the client machine 101. In other embodiments, the client-side agent 140 may be a proxy server device communicably coupled to the client machine 101 on a LAN of the client machine 101. In some embodiments, the client-side agent 140 may be an application executing in any computing device located on the same local network of the client machine 101.

In various embodiments, the client-side agent 140 is backwards-compatible because the web browser 105 is not modified in any way to interact with the client-side agent 140. Instead, as discussed below, the client-side agent is configured to monitor HTTP communications from the client machine 101 and/or web browser 105, without the client machine 101 and/or web browser 105 being aware of the existence of the client-side agent 140. The client-side agent 140 intercepts the HTTP communications to implement the backwards-compatible reduced web page loading of various embodiments.

In one embodiment, the client-side agent 140 is configured to monitor all outgoing HTTP connections from the client machine 101. In one embodiment, a system administrator configures the client-side agent 140 with identifying information of the client machine 101 that the client-side agent monitors. The system administrator then installs the client-side agent on the LAN of the client machine 101 monitored by the client-side agent (e.g., within the client machine 101 or on a separate machine in the LAN of the client machine 101). In some embodiments, the configuration of the client-side agent 140 directs an installation by the client-side agent 104 of a hook/handler at the OS level of the client machine 101 being monitored in order to catch outgoing HTTP communications from the client machine 101.

In addition, specific configuration settings may be assigned to the client-side agent 140 by a system administrator implementing a web server pack extension 150 that is operating in tandem with the client-side agent 140. In one embodiment, these specific configuration settings may include a TCP port number of the web server pack extension 150 to assign to intercepted HTTP communications destined for the server machine 120. In some embodiments, the web server pack extension may also be known as a web server extension component or a web server extension module.

When the client-side agent 140 intercepts an HTTP request being sent from client machine 101, it analyzes this request. The client-side agent 140 first determines whether the request is for content that is already stored at the client-side agent 140, e.g., in a resource datastore 145 of the client-side agent. If a request for content that the client-side agent 140 can handle is identified, then the client-side agent provides the content from the resources datastore 145 to the client machine 101.

On the other hand, if the client-side agent 140 does not identify a request for content that can be served by then client-side agent, then it then determines a destination TCP port number of the HTTP request. If the client-side agent 140 is aware of a web server pack extension 150 that is installed at the destination web server 120, then the client-side agent 140 updates the destination TCP port number of the request to a port number of a web server pack extension 150 installed at the destination. For example, if the destination of the request is server machine 120, which is the web server hosting the content of the requested webpage, then the client-side agent 140 changes the destination port number of the request (e.g., the server machine 120 standard port number) to a port number associated with the web server pack extension 150 executing on the server machine 120.

In one embodiment, client-side agent 140 may communicate with multiple web server pack extensions 150 on different server machines 120. In this scenario, all web server pack extensions 150 operating on different server machines 120 have the same default TCP port number. This allows all web server pack extensions to listen on the same port number, regardless of the server machine 120 they are operating on. Using the TCP default port number of the web server pack extension 150, the client-side agent 140 passes the request on to web server pack extension 150 for processing.

The following description assumes that the destination server machine 120 of the request is executing a web server pack extension 150 and that the client-side agent 140 has updated the request to be sent to the web server pack extension 150. In one embodiment, when the request is received at the web server pack extension 150, the web server pack extension 150 requests the page source of the URL in the request from a web server module 120 of the server machine 120. The web server module 126 locates and provides the page source code (e.g., HTML code) for the URL to the web server pack extension 150. In one embodiment, web server module 126 may locate the page source code in data stores 130 communicably coupled to the server machine 120.

In one embodiment, when the page source code is received by the web server pack extension 150, the web server pack extension 150 sends this page source code back to the requesting web browser 105 via client-side agent 140 using the previously-established TCP connection. At the same time, web server pack extension parses the page source code to identify supporting resources and/or objects found within the page source code. The base page source code of modern web pages is typically composed of the base markup page (e.g., HTML page) and multiple supporting resources and/or objects (hereinafter "resources"). These resources may include, but are not limited to, images, CSS, JavaScript, JBoss code, and so on. Resources can be of many different types, such as scripts (e.g. JavaScript), data resources (e.g. XML or other text-based data), style sheets, images and other page components. There are many image formats such as GIF, PNG, and JPEG. For a given HTML page, the number of different supporting resources may be in the range of tens or even hundreds.

In one embodiment, the web server pack extension 150 then requests each identified resources in the page source code from the web server module 126. In one embodiment, web server module 126 may obtain the identified resources from data stores 130. Web server module 126 then provides the obtained resources to the web server pack extension 150, which, in turn, creates a compressed package consisting of all of the resources of the web page that are available on the server machine 120.

The web server pack extension 150 then sends this single compresses package back to the client-side agent 140 using the previously-established TCP connection. Upon receipt of the compressed package, the client-side agent unpacks the package and stores the resources in the resource datastore 145 of the client-side agent 140. When the web browser 105 requests any of the resources referenced in the web page, the request is intercepted by the client-side agent 140. As previously mentioned, upon interception, the client-side agent 140 analyzes the request to determine whether it can be handled by the client-side agent 140. In this case, the client-side agent 140 determines that it stores content that is being requested and then provides this requested content back to the web browser 105. As a result, no new connection with the server machine 120 is made and the web browser 105 does not incur any additional time and/or expense that would be associated with establishing additional TCP connections to the server machine 120 to obtain the content.

In some embodiments, instead of sending the page source code back to the web browser and then obtaining the resources in a parallel thread, the web server pack extension 150 parses the page source code and obtains the resources before sending the page source code back to the client-side agent 140. In this embodiment, the page source code is compressed as part of the package including the identified resources. In one embodiment, if the page source code is included with the resources in the compressed package, then the compressed package should be of a type that the client-side agent 140 can decompress and read before the package is received completely. For example, Zip files or Gzip files are archives that can be decompressed and read while being received. Furthermore, in this embodiment, the package should include the page source code as the first file in the package (and then the resources subsequently following) so that a delay is minimized in providing the page source code to the web browser 105 for processing.

In some embodiment, the compressed package may be split into more than one separate package (e.g., two, three, or four packages) for transmission to the client-side agent. The client-side agent 104 may then execute multiple threads for downloading these separate packages. The multiple thread execution can speedup the download of the compressed packages in the situation where different network paths (communication channels) are created for each thread, which is a natural TCP protocol feature.

In various embodiments, because the client-side agent 140 and the web server pack extension 150 may act as plug-ins or extensions that may be built on top of an existing computing device, the client machine 101, web browser 105, and/or server machine 120 do not need to be modified to implement the above-described functionality of client-side agent 104 and/or web server pack extension 150. For example, because the client-side agent 140 updates the destination TCP port of the request to the TCP port of the web server pack extension 150, neither of the client machine 101 nor the server machine 120 are modified to be aware of the existence of/interact with the client-side agent 140 or web server pack extension 150. In addition, because the client-side agent 140 is configured to monitor outgoing HTTP communications from the client machine 101, the client machine 110 does not have to be modified to send communications to the client-side agent 140. Furthermore, any client machines 101 that do not have the client-side agent 140 functionality enabled may continue to directly send their HTTP communications to the server machine 120 without any adverse affects.

Figure 2:
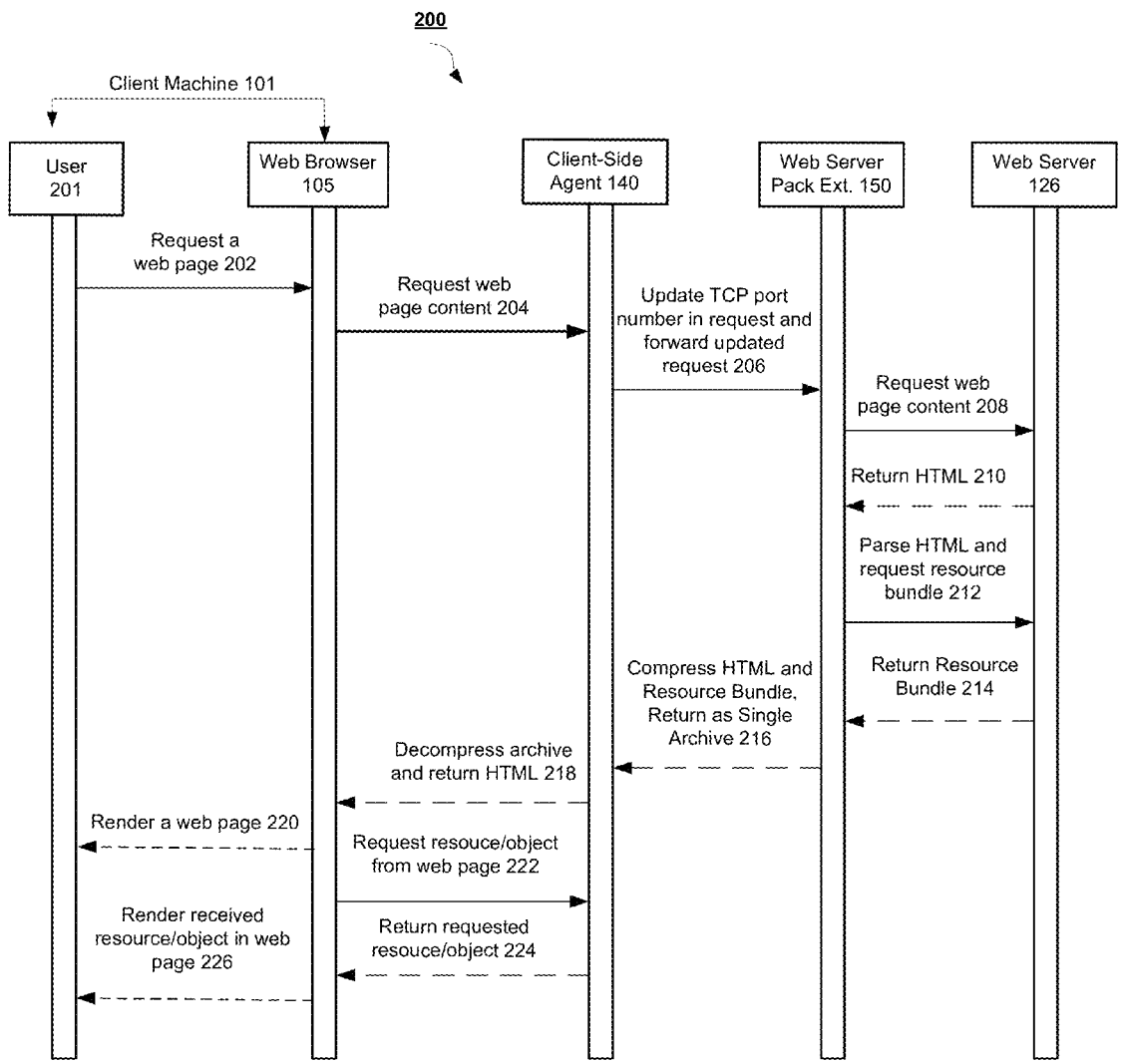
FIG. 2 is a block diagram of a process flow for reducing web page loading time using a backwards-compatible mechanism according to an embodiment of the invention.

FIG. 2 is a block diagram depicting a process flow 200 for reducing web page loading time using a backwards-compatible mechanism according to an embodiment of the invention. As shown, process 200 occurs between client machine 101, including a user 201 of web browser 105, client-side agent 140, web server pack extension 150, and web server 126. In one embodiment, client machine 101, web browser 105, client-side agent 104, web server pack extension 150, and web server 126 are the same as their counterpart components described with respect to FIG. 1.

Process flow 200 begins with the user requesting a web page from web browser (202). Web browser 105 then sends a request for the web page content (204). The client-side agent 140 is monitoring outgoing HTML communications from the client machine 101, and intercepts this web page request. When the request is intercepted, the client-side agent 140 updates a destination TCP port number of the request with a TCP port number of a web server pack extension that is executing in a web server that serves the request (206). Then, the client-side agent 140 forwards the updated request to the web server pack extension 150 (206).

When the update request is received, the web server pack extension 150 request web page content from the web server 126 (208). The web server 126 responds with the HTML code (page source code) of the requested web page (210). The web server pack extension then parses this HTML code and determines one or more resources that are part of the HTML code (212). The web server pack extension 150 then requests a resource bundle including the determined one or more resources from the web server 126 (212).

The web server then obtains the requested resources, and returns them to the web server pack extension 150 (214). The web server pack extension 150 bundles the received HTML code and resource bundle into a compressed package and send this as a single compressed package back to the client-side agent 140 (216). When the client-side agent 140 receives the compressed package, it decompressed the file and returns the HTML code to the web browser 105 (218). The web browser 105 uses the received HTML code to render the requested web page for the user 201 (220). As part of rendering the web page, the web browser may encounter additional resources required for the web page. The web browser sends a request for these additional resources (222). As mentioned above, the client-side agent 140 intercepts this request and determines that it has the requested resources in a datastore, as it had previously received these resources for the web page from the web server pack extension 150. The client-side agent 140 then returns the requested resources to the web browser 105 (224). The web browser 105 then continues rendering the web page with the requested resources (226).

The process flow 200 illustrated in FIG. 2 depicts one exemplary process to reduce web page loading time using a backwards-compatible mechanisms. Other embodiments may comprise different process flows to achieve the same end result. For example, one process flow may include the web server pack extension 150 sending the HTML code back to the client-side agent 140 prior to sending a compressed package including the resources of the web page. Another process flow may include the web server pack extension sending multiple compressed packages to the client-side agent using multiple threads (e.g., communications channels).

Figure 3:
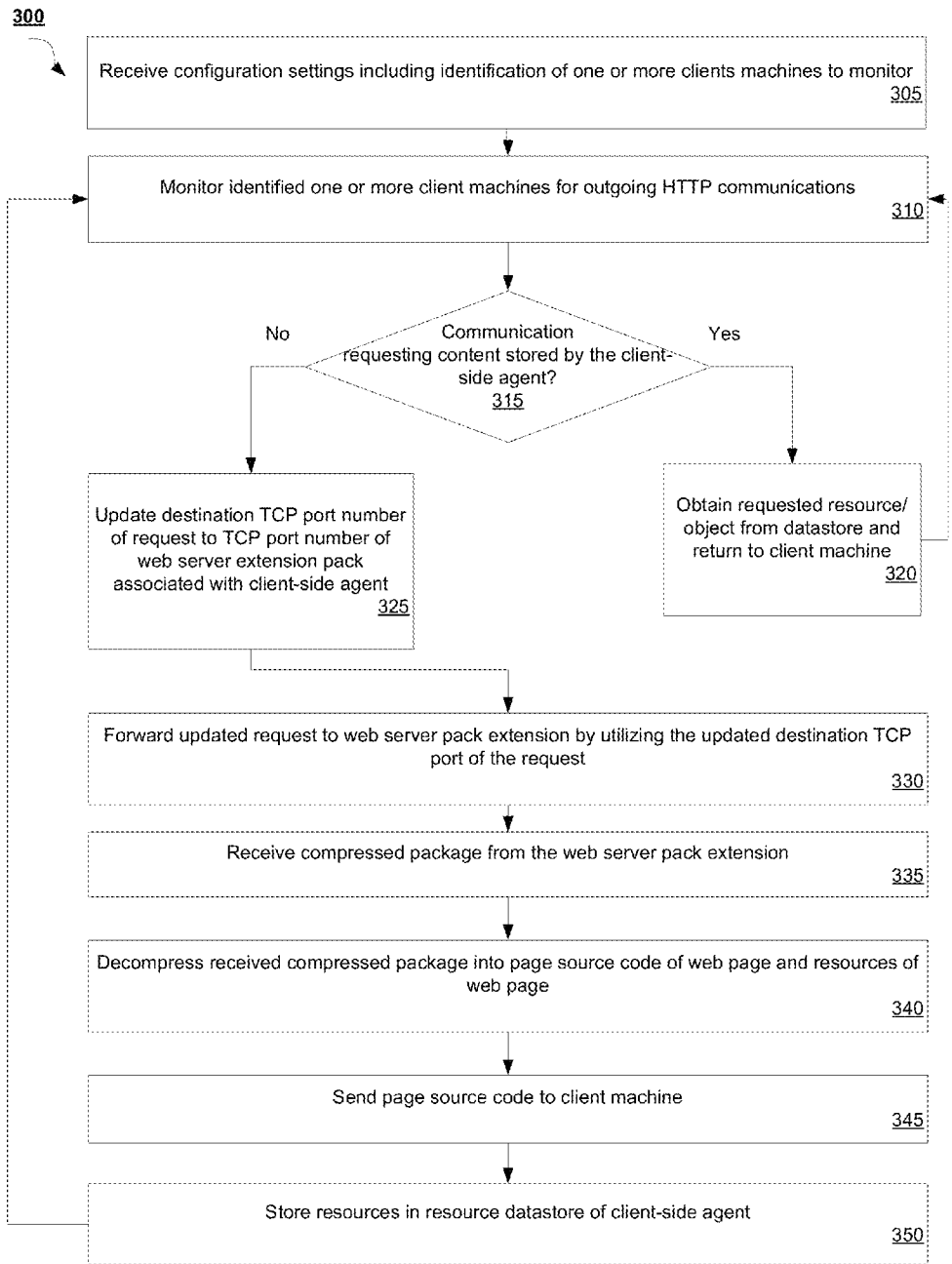
FIG. 3 is a flow diagram illustrating a method for reducing web page loading time with a backwards-compatible mechanism according to an embodiment of the invention.

FIG. 3 is a flow diagram illustrating a method 300 for reducing web page loading time with a backwards-compatible mechanism according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by client-side agent 140 of FIG. 1.

Method 300 begins at block 305 where configuration settings for the client-side agent are received by the client-side agent. In one embodiment, the configuration settings include the identification of one or more client machines to be monitored for outgoing HTTP communications. For example, the IP and MAC addresses of each of the client machines may be provided to the client-side agent. In one embodiment, an administrator of a web server machine creates and provides the configuration settings to the client-side agent. The configuration settings may also include information (e.g., TCP port, etc.) regarding a web server pack extension of the web server machine that is associated with the client-side agent. In one embodiment, the client-side agent is executing within one of the one or more client machines. In other embodiments, the client-side agent is operating on a server machine within a same LAN as the one or more client machines.

At block 310, the identified one or more client machines are monitored for outgoing HTTP communications. When an outgoing HTTP communication is detected, then, at decision block 315, it is determined whether the communication is requesting content that is stored by the client-side agent. If so, the method 300 proceeds to block 320 where the requested content is obtained from a datastore of the client-side agent and returned to the requesting client machine. Then method 330 returns to block 310 to continue monitoring for outgoing HTTP communications from the one or more client machines.

On the other hand, if the request is not for content stored by the client-side agent, then method 300 continues to block 325 where a destination TCP port in the request is updated to a TCP port of a web server pack extension associated with the client-side agent. In one embodiment, the TCP port of the web server pack extension is included in the configuration settings supplied to the client-side agent at block 305. Then, at block 330, the updated request is forwarded to the web server pack extension via the updated destination TCP port of the request.

At block 335, one or more compressed packages are received from the web server pack extension. Then, at block 340, the compressed package is decompressed and read. In one embodiment, the decompressed package includes a page source (e.g., HTML code) of the requested web page and one or more resources associated with the page source. In some embodiments, the page source code may be received separately from the resources. In such a case, the page source code is received first, and is followed by the compressed package(s) including the resources that are associated with the page source code. In some embodiments, the compressed package includes two or more packages sent from the web server pack extension that are received at the client-side agent via multiple communication channels (threads) established on the existing TCP communication channel by the TCP protocol.

At block 345, the page source code is sent to the client machine that requested the web page. Then, at block 350, the decompressed resources associated with the web page are stored in the datastore of the client-side agent. Then, method 300 returns to block 310 to monitor for further outgoing HTTP communications from the one or more client machines.

In one embodiment, the client machine that received the page source code at block 345 renders the web page for a user of a web browser of the client machine. As part of this rendering, the web browser may request the resources associated with the web page. The client-side agent intercepts these requests at blocks 310 and 315 and serves the requested content at block 320. This results in reduced web page loading time as the subsequent communications for the resources of the web page can be served by the client-side agent, thus eliminating the additional resources and time that would have been incurred from establishing additional TCP connections and HTTP requests/responses to obtain the resources from the original web server.

Figure 4:
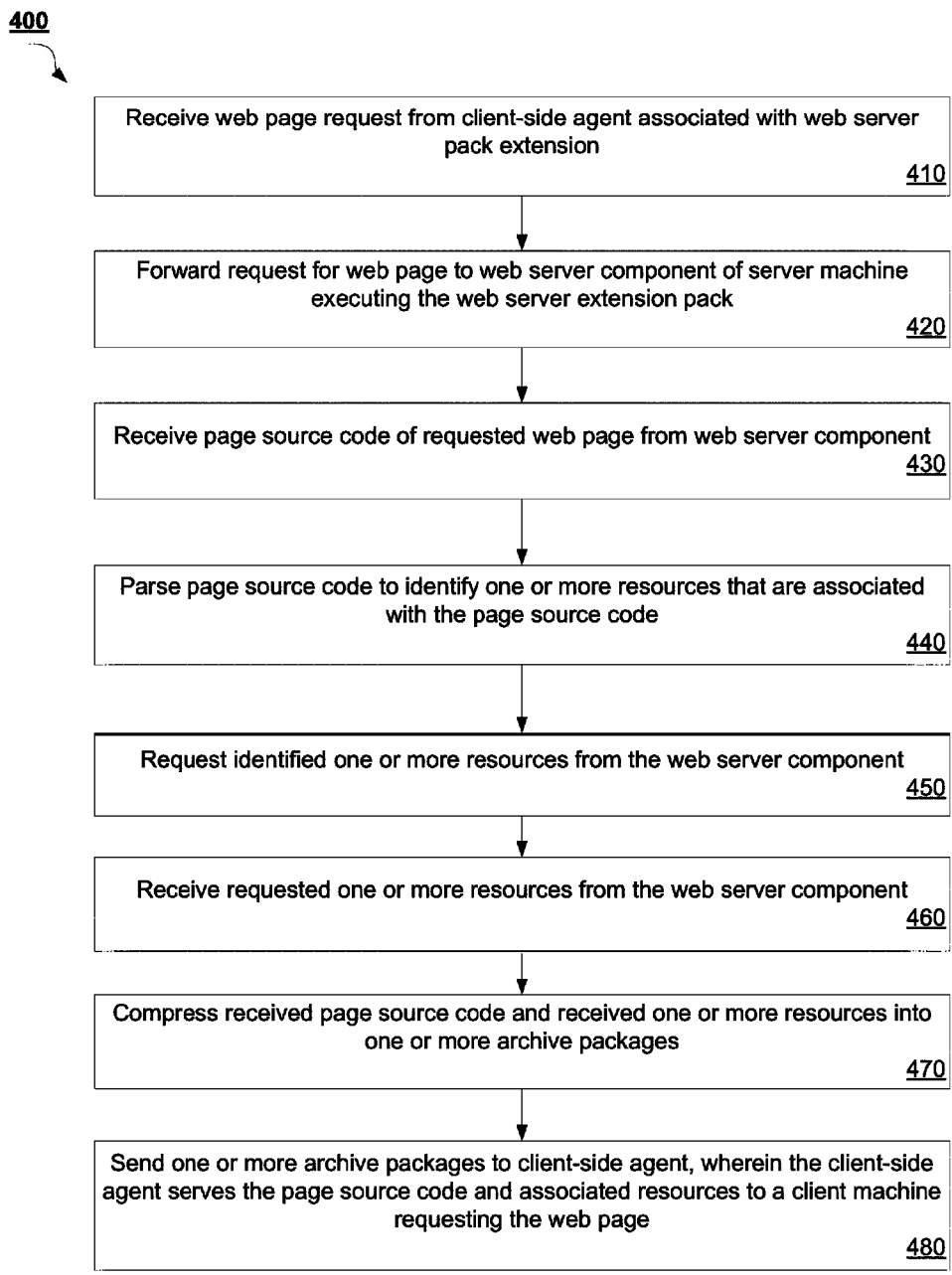
FIG. 4 is a flow diagram illustrating a method for reducing web page loading time with a backwards-compatible mechanism according to another embodiment of the invention.

FIG. 4 is a flow diagram illustrating a method 400 for reducing web page loading time with a backwards-compatible mechanism according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by web server pack extension 150 of FIG. 1.

Method 400 begins at block 410 where a web page request is received from a client-side agent associated with the web server pack extension. In one embodiment, the client-side is located on a LAN of a client machine originating the web page request. At block 420, the request for the web page is forwarded to a web server component of the server machine on which the web server pack extension is operating. At block 430, the page source code (e.g., HTML code) for the requested web page is received by the web server pack extension.

Then, at block 440, the received page source code is parsed in order to identify one or more resources that are associated with the page source code. In one embodiment, the identified one or more resources include, but are not limited to, images, CSS, JavaScript, JBoss code, and so on. These resources may be of many different types, such as scripts (e.g. JavaScript), data resources (e.g. XML or other text-based data), style sheets, images and other page components. In addition, there are may be many image formats, such as GIF, PNG, and JPEG. In one embodiment, the web server pack extension may create a list of the identified one or more resources associated with the web page.

At block 450, the identified one or more resources are then requested from the web server component. Subsequently, at block 460, the identified one or more resources are received from the web server component. In one embodiment, a subset of the requested one or more identified resources are returned by the web server component because some of the resources may not have been located by the web server component.

At block 470, the received page source code and the received resources are compressed into one or more archive packages. Lastly, at block 480, the one or more archive packages are sent to the client-side agent. In one embodiment, the client-side agent serves the page source code and associated resources to a client machine that requested the web page. This results in reduced web page loading time as the resources of the web page can be served locally by the client-side agent, thus eliminating the additional resources and time that would have been incurred from establishing additional TCP connections and HTTP requests/responses to obtain the resources from the original web server.

In one embodiment, the page source code is sent by the web server pack extension separately from the compressed resources. In such a case, the web server pack extension may send the page source code in parallel with parsing and identifying the resources associated with the page source code. Once the resources are received from the web server component, the web server pack extension then sends the compressed resources as an archive file. In some embodiments, the archive file may include two or more packages to be sent from the web server pack extension. In one embodiment, multiple communication channels (threads) established on the existing TCP communication channel by the TCP protocol are used to send these multiple packages of the archive file.

Figure 5:
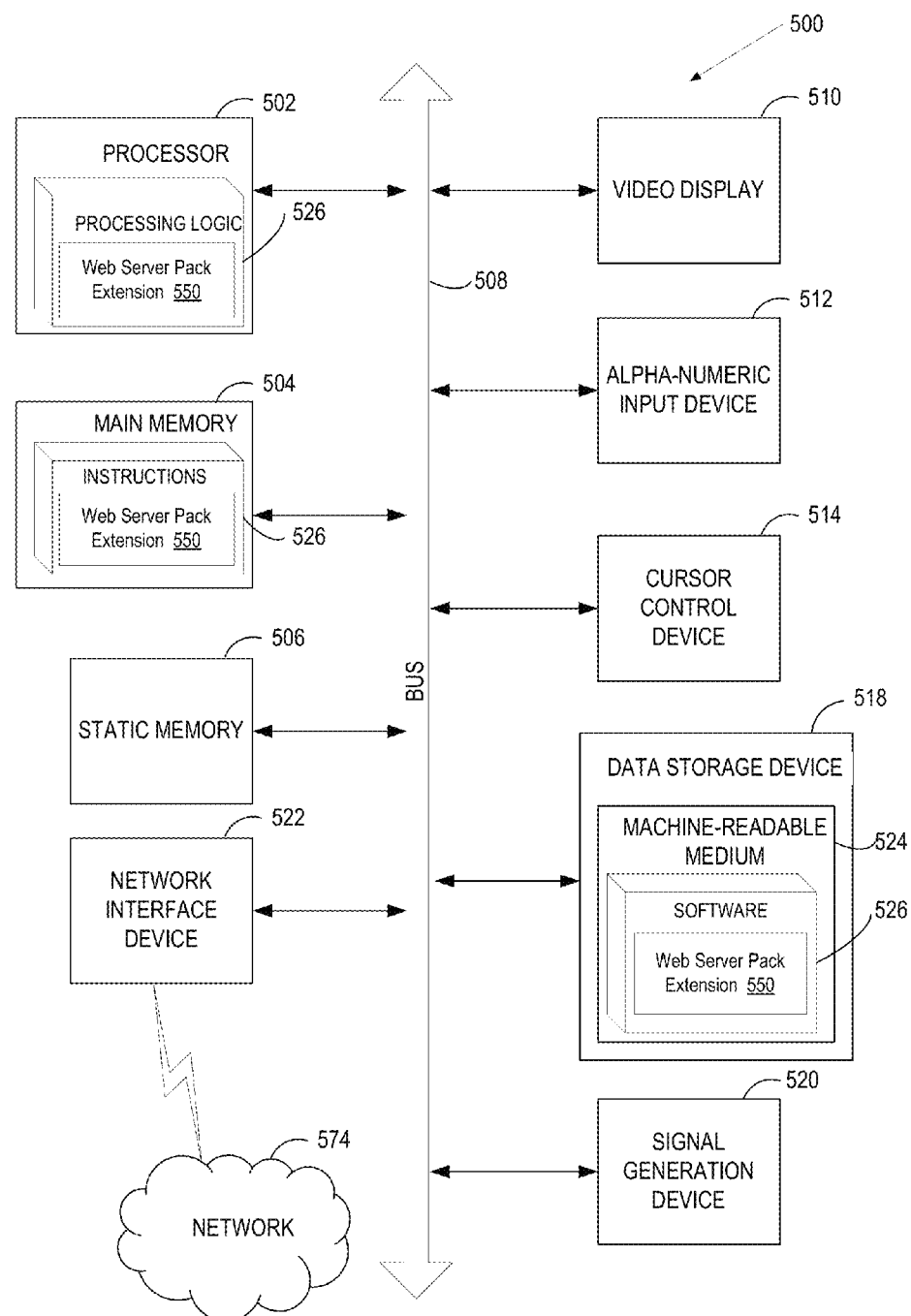
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein, illustrated in FIG. 5 by depicting instructions 526 within processor 502.

The computer system 500 may further include a network interface device 522. The computer system 500 also may include a video display unit 510 (e.g., a liquid crystal display (LCD), a cathode ray tube (CRT), or a touchscreen), an alphanumeric input device 512 (e.g., a keyboard), a cursor control device 514 (e.g., a mouse), and a signal generation device 520 (e.g., a speaker).

The data storage device 518 may include a machine-readable storage medium 524 (also known as a computer-readable storage medium) on which is stored software 526 (e.g., one or more sets of instructions, software, etc.) embodying any one or more of the methodologies or functions described herein. The software 526 may also reside, completely or at least partially, within the main memory 504 (e.g., instructions 526) and/or within the processor 502 (e.g., processing logic 526) during execution thereof by the computer system 500, the main memory 504 and the processor 502 also constituting machine-readable storage media. The software 526 may further be transmitted or received over a network 574 via the network interface device 522.

In one embodiment, the software 526 include instructions for a web server pack extension 550, which may correspond to web server pack extension 150 of FIG. 1, and/or a software library containing methods that call the web server pack extension for reducing web page loading time in a backwards-compatible way. While the machine-readable storage medium 524 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
monitoring, by a client-side agent executed by a processing device, a client machine for outgoing communications from the client machine, the outgoing communications comprising a web page request, wherein the web page request originated from a web browser of the client machine that is not modified to interact with the client-side agent, and wherein the client-side agent directs an installation of a hook at an operating system (OS) of the client machine to catch the outgoing communications from the web browser;
changing, by the client-side agent, a destination port number of a detected outgoing communication to an updated port number of a web server extension component corresponding to the client-side agent, the web server extension component comprising a module that is executing on a web server corresponding to the web page request of the outgoing communication;

forwarding, by the client-side agent, the web page request to the web server extension component via the updated port number;

receiving, by the client-side agent, page source code of a web page of the web page request and resources corresponding to the page source code, wherein the web server extension component identifies and gathers the resources in view of parsing the page source code and sends the resources as a single compressed file to the client-side agent;

decompressing the single compressed file to recover the page source code and the resources;

during the decompressing:
sending the decompressed page source code to the client machine; and
storing the decompressed resources at a data store of the client-side agent; and when a request by the client machine for any of the resources is intercepted, sending, by the client-side agent, the decompressed resources corresponding to the requested resources to the client machine;

wherein the decompressed resources stored at the client-side agent to be sent to other client machines corresponding to the client-side agent when the other client machines request the resources as part of other web page requests.

2. The method of claim 1, wherein the page source code of the web page is received prior to and separately from the resources associated with the page source code.

3. The method of claim 1, wherein the page source code of the web page and the resources are received as one or more compressed packages.

4. The method of claim 1, wherein the decompressed resources are stored in the data store of the client-side agent until requested by the client machine.

5. The method of claim 1, wherein the client-side agent is located on a same local area network (LAN) as the client machine.

6. A system, comprising:
a memory;
a processing device communicably coupled to the memory; and
a client-side agent executable from the memory by the processing device, the client-side agent to:
monitor a client machine for outgoing communications from the client machine, the outgoing communications comprising a web page request, wherein the web page request originated from a web browser of the client machine that is not modified to interact with the client-side agent, and wherein the client-side agent directs an installation of a hook at an operating system (OS) of the client machine to catch the outgoing communications from the web browser;
change a destination port number of a detected outgoing communication to an updated port number of a web server extension component corresponding to the client-side agent, the web server extension component comprising a module that is executing on a web server corresponding to the web page request of the outgoing communication;
forward the web page request to the web server extension component via the updated port number;
receive page source code of a web page of the web page request and resources corresponding to the page source code, wherein the web server extension component identifies and gathers the resources in view of parsing the page source code and sends the resources as a single compressed file to the client-side agent;
decompress the single compressed file to recover the page source code and the resources;
during the decompressing:
send the decompressed page source code to the client machine; and
store the decompressed resources at a data store of the client-side agent; and
when a request by the client machine for any of the resources is intercepted, send the decompressed resources corresponding to the requested resources to the client machine;
wherein the decompressed resources stored at the client-side agent to be sent to other client machines corresponding to the client-side agent when the other client machines request the resources as part of other web page requests.

7. The system of claim 6, wherein the page source code of the web page is received prior to and separately from the resources associated with the page source code.

8. The system of claim 6, wherein the page source code of the web page and the resources are received as one or more compressed packages.

9. The system of claim 6, wherein the decompressed resources are stored in the data store of the client-side agent until requested by the client machine.

10. The system of claim 6, wherein the client machine is located on a same local area network (LAN) as the client machine.

11. A non-transitory machine-readable storage medium including instructions that, when accessed by a processing device, cause the processing device to:
forward, by a web server extension module executed by the processing device of a server machine, a web page request to a web server component of the server machine, the web page request received from a client-side agent corresponding to the web server extension module, wherein the web page request originated from a web browser of the client machine that is not modified to interact with the client-side agent, and wherein the client-side agent directs an installation of a hook at an operating system (OS) of the client machine to catch outgoing communications from the web browser;
receive, by the web server extension module from the web server component, page source code of a web page of the web page request;
parse, by the web server extension module, the page source code to identify resources corresponding to page source code;
request, by the web server extension module, the identified resources from the web server component;
compress, by the web server extension module, the identified resources that are received from the web server component into an archive file; and
send, by the web server extension module, the page source code and the archive file to the client-side agent as one or more packages, wherein the identified resources are stored at the client-side agent and sent from the client-side agent to other client machines corresponding to the client-side agent when the other client machines request the resources as part of other web page requests.

12. The non-transitory machine-readable storage medium of claim 11, wherein the client-side agent is located on a local area network (LAN) of a client machine originating the web page request.

13. The non-transitory machine-readable storage medium of claim 11, wherein the page source code is compressed with the identified resources that are received from the web server component into the archive file.

14. The non-transitory machine-readable storage medium of claim 11, wherein the page source code is sent prior to and separately from the compressed resources of the archive file.

15. The non-transitory machine-readable storage medium of claim 14, wherein separate communications of the page source code and the archive file are sent to the client-side agent using multiple threads of a Transmission Control Protocol (TCP) communication between a web server pack extension and the client-side agent.

16. The non-transitory machine-readable storage medium of claim 11, wherein the client-side agent redirects HyperText Transfer Protocol (HTTP) communications addressed to the server machine to a web server pack extension.

* * * * *